US011159882B2

(12) United States Patent
Song et al.

(10) Patent No.: US 11,159,882 B2
(45) Date of Patent: Oct. 26, 2021

(54) ELECTRONIC DEVICE HAVING CIRCUIT STRUCTURE HAVING ELECTRIC CONNECTION BETWEEN DESIGNATED PIN INCLUDED IN CONNECTOR ELECTRICALLY CONNECTABLE TO GROUND TERMINAL OF EXTERNAL MICROPHONE AND DESIGNATED GROUND OF CIRCUIT BOARD

(71) Applicant: Samsung Electronics Co., Ltd., Gyeonggi-do (KR)

(72) Inventors: Hak-Hoon Song, Seoul (KR); Nam-Ki Kim, Gyeonggi-do (KR); Byoung-Jun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/651,428

(22) PCT Filed: Sep. 6, 2018

(86) PCT No.: PCT/KR2018/010435
§ 371 (c)(1),
(2) Date: Mar. 27, 2020

(87) PCT Pub. No.: WO2019/066293
PCT Pub. Date: Apr. 4, 2019

(65) Prior Publication Data
US 2020/0288241 A1   Sep. 10, 2020

(30) Foreign Application Priority Data

Sep. 29, 2017   (KR) ........................ 10-2017-0127564

(51) Int. Cl.
*H04M 1/02* (2006.01)
*H04R 3/00* (2006.01)
(Continued)

(52) U.S. Cl.
CPC ........ *H04R 3/007* (2013.01); *H04M 1/72412* (2021.01); *H04R 1/1091* (2013.01);
(Continued)

(58) Field of Classification Search
CPC .. H04R 5/04; H04R 2420/05; H04R 2420/09; H04R 2499/11; H04R 2201/107; H04R 1/1041; H04M 1/0274; H04M 1/0277
See application file for complete search history.

(56) References Cited

U.S. PATENT DOCUMENTS

| 7,822,400 B1 | 10/2010 | Son |
| 2006/0068856 A1* | 3/2006 | Zhu ........................ H04B 15/02 455/575.1 |

(Continued)

FOREIGN PATENT DOCUMENTS

| KR | 10-2008-0069401 A | 7/2008 |
| KR | 10-2013-0017441 A | 2/2013 |

(Continued)

*Primary Examiner* — Ping Lee
(74) *Attorney, Agent, or Firm* — Cha & Reiter, LLC

(57) ABSTRACT

Various embodiments of the present invention comprise: a circuit board comprising a first grounding portion and a second grounding portion; a wireless communication circuit arranged in a first area of the circuit board, the wireless communication circuit comprising a first grounding terminal electrically connected to the first grounding portion; an audio codec circuit arranged in a second area of the circuit board, the audio codec circuit comprising a signal input terminal and a second grounding terminal electrically connected to the second grounding portion; and a connector electrically connected to the input terminal, the connector comprising a first pin that can be electrically connected to a signal terminal of a microphone included in an external electronic device and a second pin that can be electrically connected to a grounding terminal of the microphone, the second pin being electrically connectable to the second
(Continued)

grounding portion. In addition, various other embodiments of the present invention may be possible.

6 Claims, 13 Drawing Sheets

(51) Int. Cl.
    *H04R 1/10*     (2006.01)
    *H04R 5/04*     (2006.01)
    *H04R 29/00*     (2006.01)
    *H04M 1/72412*     (2021.01)

(52) U.S. Cl.
    CPC ............. *H04R 5/04* (2013.01); *H04R 29/004* (2013.01); *H04R 2420/05* (2013.01); *H04R 2420/07* (2013.01); *H04R 2420/09* (2013.01); *H04R 2499/11* (2013.01)

(56) References Cited

U.S. PATENT DOCUMENTS

| | | |
|---|---|---|
| 2009/0052720 A1 | 2/2009 | Nishi et al. |
| 2009/0225999 A1 | 9/2009 | Lee |
| 2010/0087218 A1 | 4/2010 | Flannosh et al. |
| 2013/0010657 A1 | 1/2013 | Flannosh et al. |
| 2013/0289971 A1 | 10/2013 | Parkinson et al. |
| 2014/0018016 A1 | 1/2014 | Chang et al. |
| 2015/0098579 A1 | 4/2015 | Holzmann |

FOREIGN PATENT DOCUMENTS

| | | |
|---|---|---|
| KR | 10-1607899 B1 | 3/2016 |
| KR | 10-2017-0080638 A | 7/2017 |

* cited by examiner

ELECTRONIC DEVICE HAVING CIRCUIT STRUCTURE HAVING ELECTRIC CONNECTION BETWEEN DESIGNATED PIN INCLUDED IN CONNECTOR ELECTRICALLY CONNECTABLE TO GROUND TERMINAL OF EXTERNAL MICROPHONE AND DESIGNATED GROUND OF CIRCUIT BOARD

CROSS REFERENCE TO RELATED APPLICATIONS

This application is a National Phase Entry of PCT International Application No. PCT/KR2018/010435, which was filed on Sep. 6, 2018, and claims a priority to Korean Patent Application No. 10-2017-0127564, which was filed on Sep. 29, 2017, the contents of which are incorporated herein by reference.

TECHNICAL FIELD

Various embodiments of the present invention relate to an electronic device with a circuit structure in which a designated pin included in a connector electrically connectable with a ground terminal of an external microphone is electrically connected with a designated ground of a circuit board.

BACKGROUND ART

Audio devices, such as earphones, ear microphones, earsets, headphones, or headsets, may be connected to electronic devices. The audio devices may be connected from the outside of an electronic device to the electronic device via a connector and may thus be referred to as external electronic devices.

An audio device, e.g., an earset, may have a connecting unit (e.g., an earset connecting unit) for connecting to an electronic device. For example, the earset connecting unit may be formed as a standard 3.5pi jack, and the electronic device connecting unit may be implemented as a socket. If the jack-type audio device (e.g., an earphone jack) is plugged into the socket-type external electronic device connecting unit (e.g., an earphone jack socket), the L channel audio terminal, R channel audio terminal, ground terminal, and microphone terminal of the audio device connecting unit may be electrically connected with the L channel audio terminal, R channel audio terminal, ground terminal, and microphone terminal, respectively, of the electronic device connecting unit.

DETAILED DESCRIPTION OF THE INVENTION

Technical Problem

A component consuming relatively large current, such as a power amplifier module (PAM), may be placed on the circuit board on which an electronic device connecting unit to which an audio set, e.g., earset, is connected, is disposed. Noise signals generated as a large current flows occurring through the power amplifier module may be transferred through at least one ground unit formed on the circuit board to the circuit to which the audio device is connected.

According to various embodiments of the present invention, there may be provided an electronic device with a circuit structure in which a designated pin included in a connector electrically connectable with a ground terminal of an external microphone is electrically connected with a designated ground of a circuit board, which may remove noise signals by connecting a ground terminal of a microphone of an earset connected to an electronic device to a ground unit of an audio codec.

Technical Solution

To achieve the foregoing or other objects, according to an embodiment, an electronic device comprises a circuit board including a first ground unit and a second ground unit, a wireless communication circuit including a first ground terminal electrically connected with the first ground unit and disposed in a first area of the circuit board, an audio codec circuit including a second ground terminal electrically connected with the second ground unit and an input terminal of signal and disposed in a second area of the circuit board, and a connector including a first pin electrically connected with the input terminal and electrically connectable with a signal terminal of a microphone included in an external electronic device and a second pin electrically connectable with a ground terminal of the microphone, the second pin electrically connected with the second ground unit.

Further, according to an embodiment, an electronic device comprises a circuit board including a first ground unit and a second ground unit, a wireless communication circuit including a first ground terminal electrically connected with the first ground unit and disposed in a first area of the circuit board, an audio codec circuit including a second ground terminal electrically connected with the second ground unit and a signal input terminal and disposed in a second area of the circuit board, and a connector including a first pin electrically connectable with a signal terminal of a microphone included in an external electronic device and a second pin electrically connectable with a ground terminal of a microphone included in the external electronic device, wherein the first pin is electrically connected with the microphone input terminal of the audio codec circuit, the second pin is electrically connected with the earphone feedback terminal of the audio codec circuit, and the second pin may be directly connected with the second ground terminal of the audio codec circuit by a conductive pattern.

Advantageous Effects

According to various embodiments, in the electronic device, the ground terminal of the microphone of an earset connected with the electronic device is connected with the ground unit of an audio codec, thereby addressing the foregoing or other problems.

MODE FOR CARRYING OUT THE INVENTION

Figure 1:
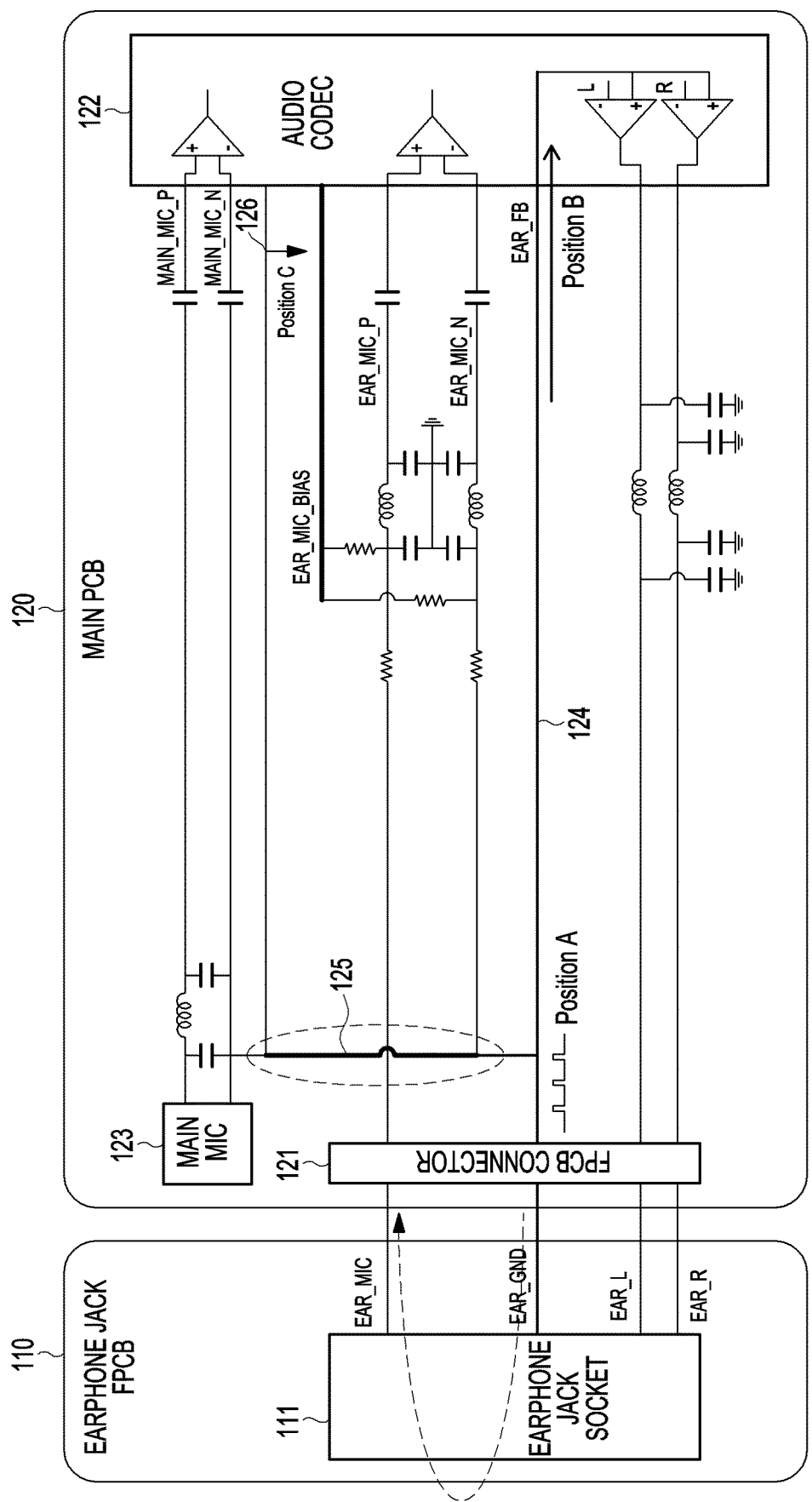
FIG. 1 is a view illustrating a circuit of an electronic device according to various embodiments of the present invention.

Hereinafter, embodiments of the present invention are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Examples of the electronic device may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to other embodiments, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning satellite (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to some embodiments, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment, the electronic device may be one or a combination of the above-listed devices. According to some embodiments, the electronic device may be a flexible electronic device. The electronic device disclosed herein is not limited to the above-listed devices, and may include new electronic devices depending on the development of technology.

In various embodiments described below, audio devices, such as earphones, ear microphones, earsets, headphones, or headsets, are able to be connected to an electronic device via, e.g., a connector, from outside of the electronic device and are thus referred to as an 'external electronic device' or 'external audio device' for convenience.

In various embodiments described below, the term 'pattern,' 'electrical conductive portion,' 'electrical conductive material,' or 'electrical conductor' includes meaning a material, element, member, part, or component with a conductive pattern, as well as any material, element, member, part, or component which allows a current to flow therethrough, and is interpreted in the broadest concept without being limited to a specific material, shape, or pattern.

Hereinafter, electronic devices are described with reference to the accompanying drawings, according to various embodiments. As used herein, the term "user" may denote a human or another device (e.g., an artificial intelligent electronic device) using the electronic device.

FIG. 1 is a view illustrating a circuit of an electronic device according to various embodiments of the present invention. Referring to FIG. 1, an electronic device may include an earphone jack flexible printed circuit board (FPCB) 110 and a main printed circuit board (PCB) 120. According to an embodiment, the main PCB 120 and the earphone jack FPCB 110 may be configured as a single circuit board.

According to various embodiments, various components, e.g., an FPCB connector 121, an audio codec 122, and a main microphone (hereinafter, a main MIC) 123, may be arranged on the main PCB 120. The audio codec 122 may receive an analog voice signal input by the main MIC 123 and convert the analog voice signal into a digital signal.

According to various embodiments, the audio codec 122 may output the analog voice signal and transmit the analog voice signal via an EAR_L and EAR_R line to an earphone jack socket 111 and may receive a voice signal via an EAR_MIC_P line and EAR_MIC_N line from the earphone jack socket 111.

According to various embodiments, the earphone jack part of the earset may be connected via the earphone jack socket 111 formed on the earphone jack FPCB 110. For example, four terminals (e.g., EAR_MIC, EAR_GND, EAR_L, and EAR_R) of the earphone jack socket 111 each may be connected to the FPCB connector 121 formed on the main PCB 120. Among the four terminals formed in the earphone jack socket 111, the EAR_MIC is a terminal that outputs signals input via the microphone provided in the earset connected (or plugged) into the earphone jack socket 111, the EAR_GND is a ground terminal for input/output signals of the earphone or microphone, the EAR_L is a terminal for left voice signal input in the earphone provided in the earset, and the EAR_R is a terminal for right voice signal input in the earphone provided in the earset.

According to various embodiments, the four terminals of the earphone jack socket 111 may be separately connected to the terminals of the audio codec 122 via the pins formed in the FPCB connector 121. For example, the EAR_MIC terminal of the earphone jack socket 111 may be connected with the EAR_MIC_P terminal of the audio codec 122 via a first pin of the FPCB connector 121. The EAR_GND terminal of the earphone jack socket 111 may be connected with the earphone feedback terminal (EAR_FB) of the audio codec 122 via a second pin of the FPCB connector 121, and the signal output via the EAR_GND terminal (the earphone ground terminal or microphone ground terminal) may be fed back, as an input signal, to the differential amplifier in the audio codec 122. According to various embodiments of the present invention, a position near the FPCB connector 121 on the connection line of the earphone feedback terminal is referred to as position A, and a position near the audio codec 122 is referred to as position B.

According to various embodiments, the EAR_L terminal of the earphone jack socket 111 may be connected with the left voice signal output terminal of the audio codec 122 via the FPCB connector 121, and the EAR_R terminal may be connected with the right voice signal output terminal of the audio codec 122 via the FPCB connector 121.

According to various embodiments, upon connection with the ground unit of the audio codec 122 at position A on the connection line of the earphone feedback terminal where the EAR_GND of the earphone jack socket 111 and the earphone feedback terminal EAR_FB are connected, a better performance may result for crosstalk between the left and right signals of the received signals Rx, but the power amplifier module (PAM) disposed on the main PCB 120 may come close to position A and may thus be significantly influenced by noise due to time division multiple access (TDMA) signals.

According to various embodiments, upon connection with the ground unit of the audio codec 122 at position B on the connection line of the earphone feedback terminal where the EAR_GND of the earphone jack socket 111 and the earphone feedback terminal EAR_FB are connected, the PAM is separated away from position B and is thus relatively less influenced by TDMA noise. However, as the distance between the FPCB connector 121 and the ground unit increases, the resistance increases and performance for crosstalk of received signals Rx may be deteriorated.

According to various embodiments, as shown in FIG. 1, a separate pattern (e.g., conductive pattern) (or transmission line) 125 may be formed in parallel at the earphone feedback terminal EAR_FB adjacent to the FPCB connector 121, and the pattern (or transmission line) 125 may be directly connected to the ground unit of the audio codec 122. As the pattern 125 is formed, such an effect as grounding to position C 126 adjacent to the audio codec 122 may result. According to various embodiments of the present invention, formation of such a pattern may raise the performance for crosstalk while being less influenced by TDMA noise due to the PAM.

According to various embodiments, the separately formed pattern 125 may be connected with the main_MIC_N line of the main MIC 123. For example, the pattern 125 may be used as a ground unit of the main MIC 123.

Figure 2:
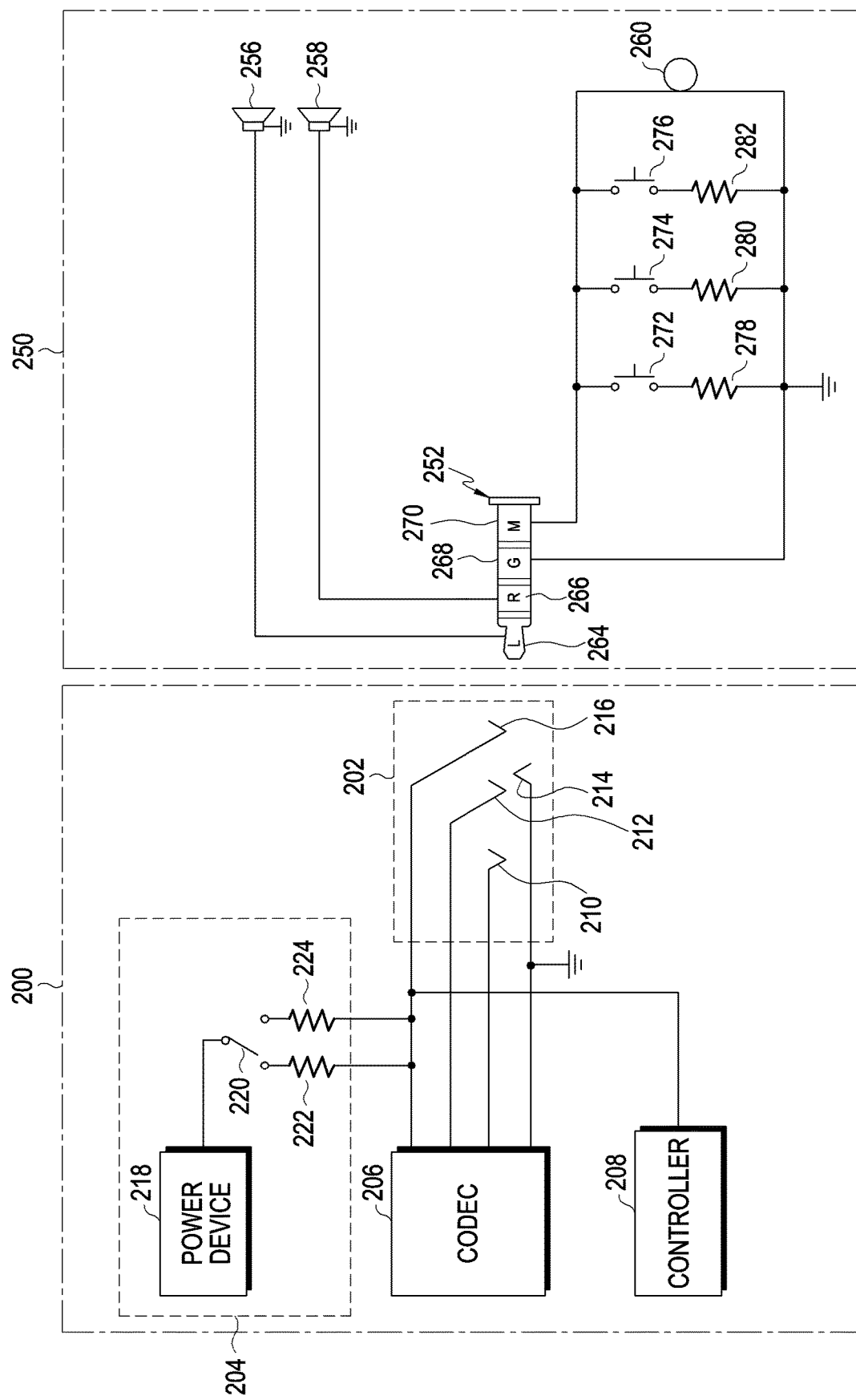
FIG. 2 is a block diagram illustrating an example in which an audio device is connected to an electronic device according to various embodiments of the present invention.

FIG. 2 is a block diagram illustrating an example in which an audio device is connected to an electronic device according to various embodiments of the present invention. Referring to FIG. 2, an audio device, e.g., an earphone 250 (or earset), may be connected to an electronic device 200. The electronic device 200 may be connected with an earphone 250 via a four-pole connecting unit including an L channel audio terminal 210, an R channel audio terminal 212, a ground terminal 214, and a microphone terminal 216 and a four-pole connecting unit including a left (L) channel audio terminal 264, a right (R) channel audio terminal 266, a ground terminal 268, and a microphone terminal 270 of the earphone 250.

According to various embodiments, the electronic device 200 may include an electronic device-side connecting unit 202 (e.g., the earphone jack socket 111 of FIG. 1), a power supply unit 204, a coder-decoder (CODEC) 206 (e.g., the audio codec 122 of FIG. 1), and a controller 208. The earphone 250 may include an audio-side connecting unit 252 (e.g., an earphone jack), an L channel speaker 256, an R channel speaker 258, a microphone 260, a volume-up switch 272, a volume-down switch 274, a send/end switch 276, and resistors 278 to 282.

According to various embodiments, the electronic device-side connecting unit 202 may include an L channel audio terminal 210 for outputting L channel audio signals to the earphone 250, an R channel audio terminal 212 for outputting R channel audio signals to the earphone 250, a ground terminal 214, and a microphone terminal 216 for inputting microphone signals from the earphone 250.

According to various embodiments, the audio-side connecting unit 252 (e.g., an earphone jack) may include an L channel audio terminal 264 for inputting L channel audio signals from the electronic device 200, an R channel audio terminal 266 for inputting R channel audio signals from the electronic device 200, a ground terminal 268, and a microphone terminal 270 for outputting microphone signals to the electronic device 200.

For example, the audio-side connecting unit 252 (e.g., an earphone jack) may be implemented as a jack, and the electronic device-side connecting unit 252 (e.g., an earphone jack socket) may be implemented as a socket. If the socket-type electronic device-side connecting unit 202 is plugged into the jack-type audio-side connecting unit 252, the L channel audio terminal 210, R channel audio terminal 212, ground terminal 214, and microphone terminal 216 of the electronic device-side connecting unit 202 may be connected with the L channel audio terminal 264, R channel audio terminal 266, ground terminal 268, and microphone terminal 270, respectively, of the audio-side connecting unit 252.

According to various embodiments, the terminals 210 to 216 of the audio-side connecting unit 202 may be connected to the codec 206. The codec 206 may output audio signals to the L channel audio terminal 210 and the R channel audio terminal 212 and receive microphone signals from the microphone terminal 216.

According to various embodiments, the power supply unit 204 may be used as a driving power source of the microphone 260 of the earphone 250 via the microphone terminal 216.

According to various embodiments, the controller 208 may be implemented as a processor, such as an application processor (AP) that may be included in the electronic device 200. For example, the controller 208 may also be implemented as the processor 120 of the electronic device 102 of FIG. 1.

According to various embodiments, the controller 208 may input the voltage of the microphone terminal 216. If an AP is used as the controller 208, the controller 208 may input the voltage of the microphone terminal 216 via an analog-to-digital converter (ADC). Hence, the controller 208 may recognize the voltage that has been input via the ADC port and converted into a digital value. The controller 208 may control a power device 218 to apply to the microphone terminal 216.

According to various embodiments, the power supply unit 204 may include the power device 218, a switch 220, and resistors 222 and 224. The power supply unit 204 may be operated by the controller 208 to generate power. The power device 218 may be a power converter, e.g., a low dropout (LDO) generating power from the battery of the electronic device 200. The switch 220 and resistors 222 and 224 may be connected between the microphone terminal 216 and the output terminal of the power device 218. The switch 220 may be controlled by the controller 208 to apply output power from the power device 218 to the microphone terminal 216 via one of the resistors 222 and 224. Power is applied from the power device 218 through the switch 220 and resistor 222 to the microphone terminal 216, and power is applied from the power device 218 through the switch 220 and resistor 224 to the microphone terminal 216.

According to various embodiments, the resistor 222 may have a larger resistance than the resistor 224. The resistor 222 may have a resistance corresponding to the consumed current of the microphone 260. For example, the resistance of the resistor 222 may be 2.2 kΩ, and the resistance of the resistor 224 may be 1000Ω.

According to various embodiments, a microphone 260, a pair of volume-up switch 272 and resistor 278 connected together in series, a pair of volume-down switch 274 and resistor 280 connected together in series, and a pair of send/end switch 276 and resistor 282 connected together in series may be connected in parallel between the microphone terminal 270 and the ground terminal 268. The volume-up switch 272, the volume-down switch 274, and the send/end switch 276 may be automatic return contact-type pressing button switches that are turned on when pressed and off when the pressing is released. The volume-up switch 272 may be used as a volume-up key indicating volume-up to the electronic device 200. The volume-down switch 274 may be used as a volume-down key indicating volume-down to the electronic device 200. The send/end switch 276 may be used as a send/end key indicating, e.g., call start or call end.

According to various embodiments, the resistors 278 to 282 may have different resistances. Hence, if the volume-up switch 272, volume-down switch 274, and send/end switch 276 each turn on, the voltage of the microphone terminal 216 may vary. For example, the resistance of the resistor 278 may be 619Ω, the resistance of the resistor 280 may be 221Ω, and the resistance of the resistor 282 may be 50Ω. Thus, the electronic device 200 may identify the kind of the switch that is turned on among the volume-up switch 272, volume-down switch 274, and send/end switch 276, based on the voltage of the microphone terminal 216.

Figure 3:
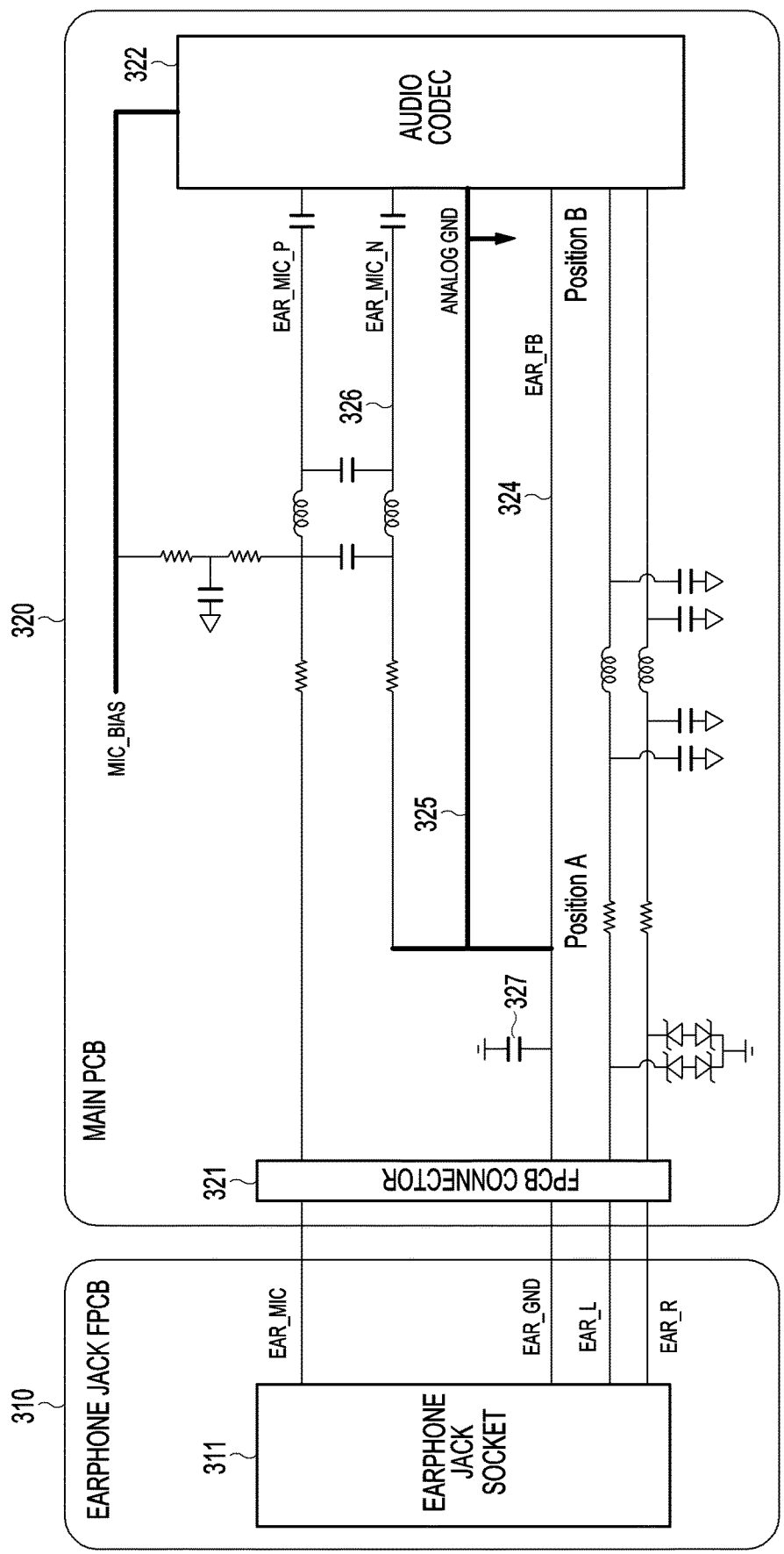
FIG. 3 is a view illustrating a circuit of an electronic device according to various embodiments of the present invention.

FIG. 3 is a view illustrating a circuit of an electronic device according to various embodiments of the present invention. Referring to FIG. 3, an electronic device may include an earphone jack flexible printed circuit board (FPCB) 310 (e.g., the earphone jack FPCB 110) and a main printed circuit board (PCB) 320 (e.g., the main PCB 120).

According to various embodiments, various components, e.g., an FPCB connector 321 (e.g., the FPCB connector 121)

or an audio codec 322 (e.g., the audio codec 122), may be arranged on the main PCB 320.

According to various embodiments, the audio codec 322 may output an analog voice signal and transmit the analog voice signal via the EAR_L and EAR_R line to an earphone jack socket 311 (e.g., the earphone jack socket 111) and may receive a voice signal via an EAR_MIC_P line and EAR_MIC_N line from the earphone jack socket 311.

According to various embodiments, the earphone jack of the earset may be plugged or connected via the earphone jack socket formed on the earphone jack FPCB 310. For example, four terminals (e.g., EAR_MIC, EAR_GND, EAR_L, and EAR_R) of the earphone jack socket 311 each may be connected to the FPCB connector 321 formed on the main PCB 320. Among the four terminals formed in the earphone jack socket 311, the EAR_MIC is a terminal that outputs signals input via the microphone provided in the earset, the EAR_GND is a ground terminal for input/output signals of the earphone or microphone, the EAR_L is a terminal for left voice signal input in the earphone provided in the earset, and the EAR_R is a terminal for right voice signal input in the earphone provided in the earset.

According to various embodiments, the four terminals of the earphone jack socket 311 may be separately connected to the terminals of the audio codec 322 via the FPCB connector 321. For example, the EAR_MIC terminal of the earphone jack socket 311 may be connected with the EAR_MIC_P terminal of the audio codec 322. The EAR_GND terminal of the earphone jack socket 311 may be connected with the earphone feedback terminal (EAR_FB) of the audio codec 322, and the signal output via the EAR_GND terminal (the earphone ground terminal or microphone ground terminal) may be fed back, as an input signal, to the differential amplifier in the audio codec 322. According to various embodiments of the present invention, a position near the FPCB connector 321 on the connection line of the earphone feedback terminal is referred to as position A, and a position near the audio codec 322 is referred to as position B.

According to various embodiments, the EAR_L terminal of the earphone jack socket 311 may be connected with the left voice signal output terminal of the audio codec 322 via the FPCB connector 321, and the EAR_R terminal may be connected with the right voice signal output terminal of the audio codec 322 via the FPCB connector 321.

According to various embodiments, upon connection with the ground unit of the audio codec 322 at position A on the connection line of the earphone feedback terminal where the EAR_GND of the earphone jack socket 311 and the earphone feedback terminal EAR_FB are connected, a better performance may result for crosstalk between the left and right signals of the received signals Rx, but the PAM disposed on the main PCB 320 may come close to position A and may thus be significantly influenced by noise due to TDMA signals.

According to various embodiments, upon connection with the ground unit of the audio codec 322 at position B on the connection line of the earphone feedback terminal where the EAR_GND of the earphone jack socket 311 and the earphone feedback terminal EAR_FB are connected, the PAM is separated away from position B and is thus relatively less influenced by TDMA noise. However, as the distance between the FPCB connector 321 and the ground unit increases, the resistance increases and performance for crosstalk of received signals Rx may be deteriorated.

According to various embodiments, as shown in FIG. 3, a separate pattern (or transmission line) 325 may be formed in parallel at the earphone feedback terminal EAR_FB adjacent to the FPCB connector 321, and the pattern (e.g., the conductive pattern) (or transmission line) 325 may be directly connected to the ground unit of the audio codec 322. As the pattern 325 is formed, such an effect as grounding to position C adjacent to the audio codec 322 may result. According to various embodiments of the present invention, formation of such a pattern may raise the performance for crosstalk while being less influenced by TDMA noise due to the PAM.

According to various embodiments, the separately formed pattern 325 may be connected with the EAR_MIC_N line. For example, the pattern 325 may be used as a ground unit for the microphone signal output from the earphone jack socket 311. According to various embodiments of the present invention, at least one capacitor 327 may be connected in parallel between the FPCB connector 321 and the pattern 325.

Figure 4:
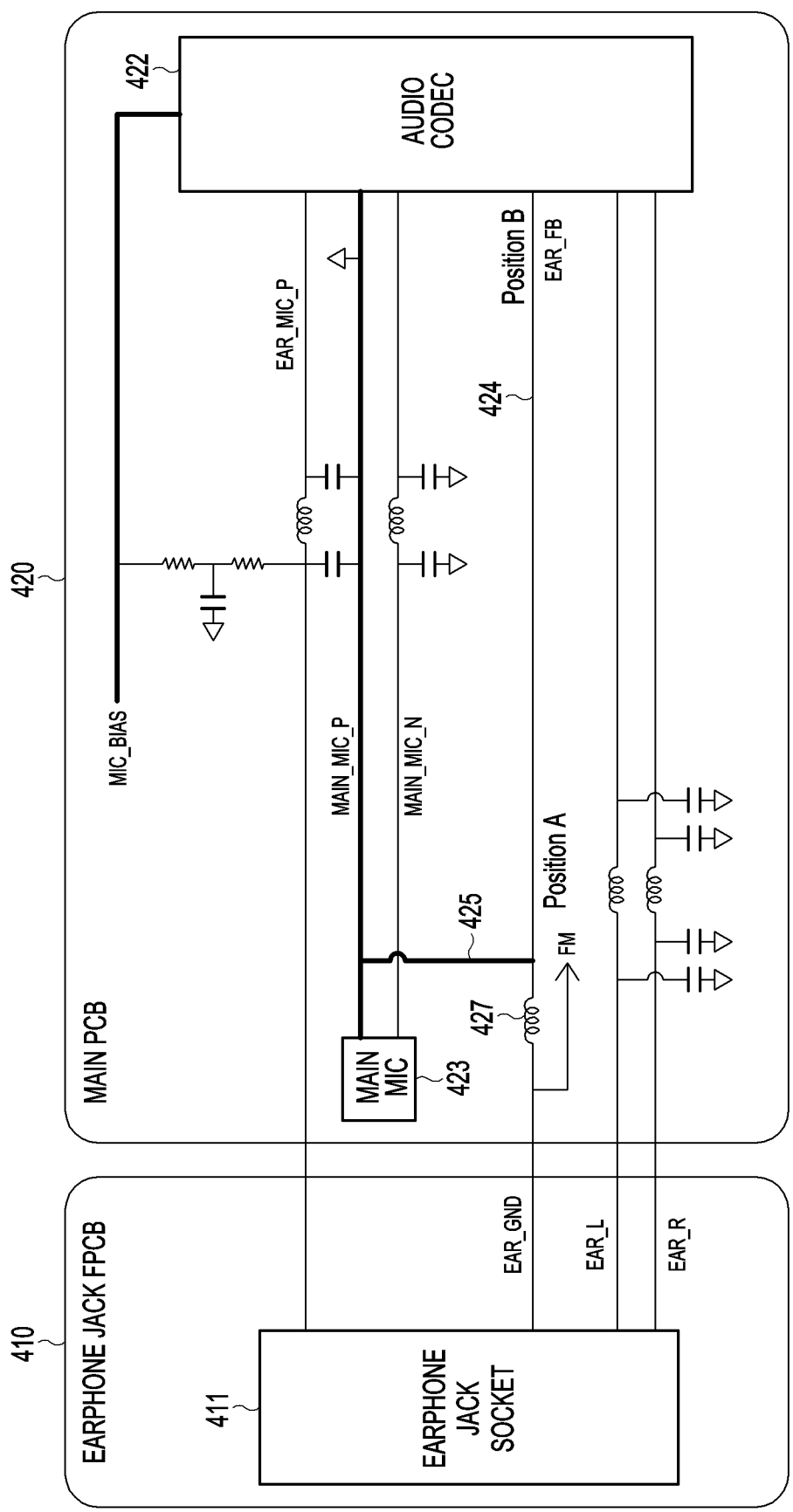
FIG. 4 is a view illustrating a circuit of an electronic device according to various embodiments of the present invention.

FIG. 4 is a view illustrating a circuit of an electronic device according to various embodiments of the present invention. Referring to FIG. 4, an electronic device may include an earphone jack flexible printed circuit board (FPCB) 410 (e.g., the earphone jack FPCB 110 or 310) and a main printed circuit board (PCB) 420 (e.g., the main PCB 120 or 320).

According to various embodiments, various components, e.g., an FPCB connector (e.g., the FPCB connector 121 or 321), an audio codec 422 (e.g., the audio codec 122 or 322), and a main MIC 423 (e.g., the main MIC 123), may be arranged on the main PCB 420. The audio codec 422 may receive an analog voice signal input by the main MIC 423 and convert the analog voice signal into a digital signal.

According to various embodiments, the audio codec 422 may output an analog voice signal and transmit the analog voice signal via the EAR_L and EAR_R line to an earphone jack socket 411 (e.g., the earphone jack socket 111) and may receive a voice signal via an EAR_MIC_P line and EAR_MIC_N line from the earphone jack socket 411.

According to various embodiments, the earphone jack of the earset may be connected via the earphone jack socket 111 formed on the earphone jack FPCB 410. For example, four terminals (e.g., EAR_MIC, EAR_GND, EAR_L, and EAR_R) of the earphone jack socket 411 each may be connected to the FPCB connector 121 formed on the main PCB 420. Among the four terminals formed in the earphone jack socket 411, the EAR_MIC is a terminal that outputs signals input via the microphone provided in the earset, the EAR_GND is a ground terminal for input/output signals of the earphone or microphone, the EAR_L is a terminal for left voice signal input in the earphone provided in the earset, and the EAR_R is a terminal for right voice signal input in the earphone provided in the earset.

According to various embodiments, the four terminals of the earphone jack socket 411 may be separately connected to the terminals of the audio codec 422 via the FPCB connector. For example, the EAR_MIC terminal of the earphone jack socket 411 may be connected with the EAR_MIC_P terminal of the audio codec 422. The EAR_GND terminal of the earphone jack socket 411 may be connected with the earphone feedback terminal (EAR_FB) of the audio codec 422, and the signal output via the EAR_GND terminal (the earphone ground terminal or microphone ground terminal) may be fed back, as an input signal, to the differential amplifier in the audio codec 422. According to various embodiments of the present invention, a position near the FPCB connector on the connection line of the earphone feedback terminal is referred to as position A, and a position near the audio codec 422 is referred to as position B.

According to various embodiments, the EAR_L terminal of the earphone jack socket 411 may be connected with the left voice signal output terminal of the audio codec 422 via the FPCB connector, and the EAR_R terminal may be connected with the right voice signal output terminal of the audio codec 422 via the FPCB connector.

According to various embodiments, upon connection with the ground unit of the audio codec 422 at position A on the connection line of the earphone feedback terminal where the EAR_GND of the earphone jack socket 411 and the earphone feedback terminal EAR_FB are connected, a better performance may result for crosstalk between the left and right signals of the received signals Rx, but the PAM disposed on the main PCB 420 may come close to position A and may thus be significantly influenced by noise due to TDMA signals.

According to various embodiments, upon connection with the ground unit of the audio codec 422 at position B on the connection line of the earphone feedback terminal where the EAR_GND of the earphone jack socket 411 and the earphone feedback terminal EAR_FB are connected, the PAM is separated away from position B and is thus relatively less influenced by TDMA noise. However, as the distance between the FPCB connector and the ground unit increases, the resistance increases and performance for crosstalk of received signals Rx may be deteriorated.

According to various embodiments, as shown in FIG. 4, a separate pattern (or transmission line) 425 may be formed in parallel at the earphone feedback terminal EAR_FB adjacent to the FPCB connector, and the pattern (or transmission line) 425 may be directly connected to the ground unit of the audio codec 322. As the pattern 425 is formed, such an effect as grounding to position C adjacent to the audio codec 422 may result. According to various embodiments of the present invention, formation of such a pattern may raise the performance for crosstalk while being less influenced by TDMA noise due to the PAM.

According to various embodiments, the separately formed pattern 425 may be shared with, or at least partially connected with, the main MIC_N line of the main MIC 423. For example, the pattern 425 may be used as a ground unit for the microphone signal output from the main MIC 423. According to various embodiments of the present invention, at least one coil 427 or bead may be connected in series between the FPCB connector and the pattern 425. Frequency modulation (FM) noise signals output to the EAR_GND terminal of the earphone jack 411 may be removed by the coil 427.

Figure 5:
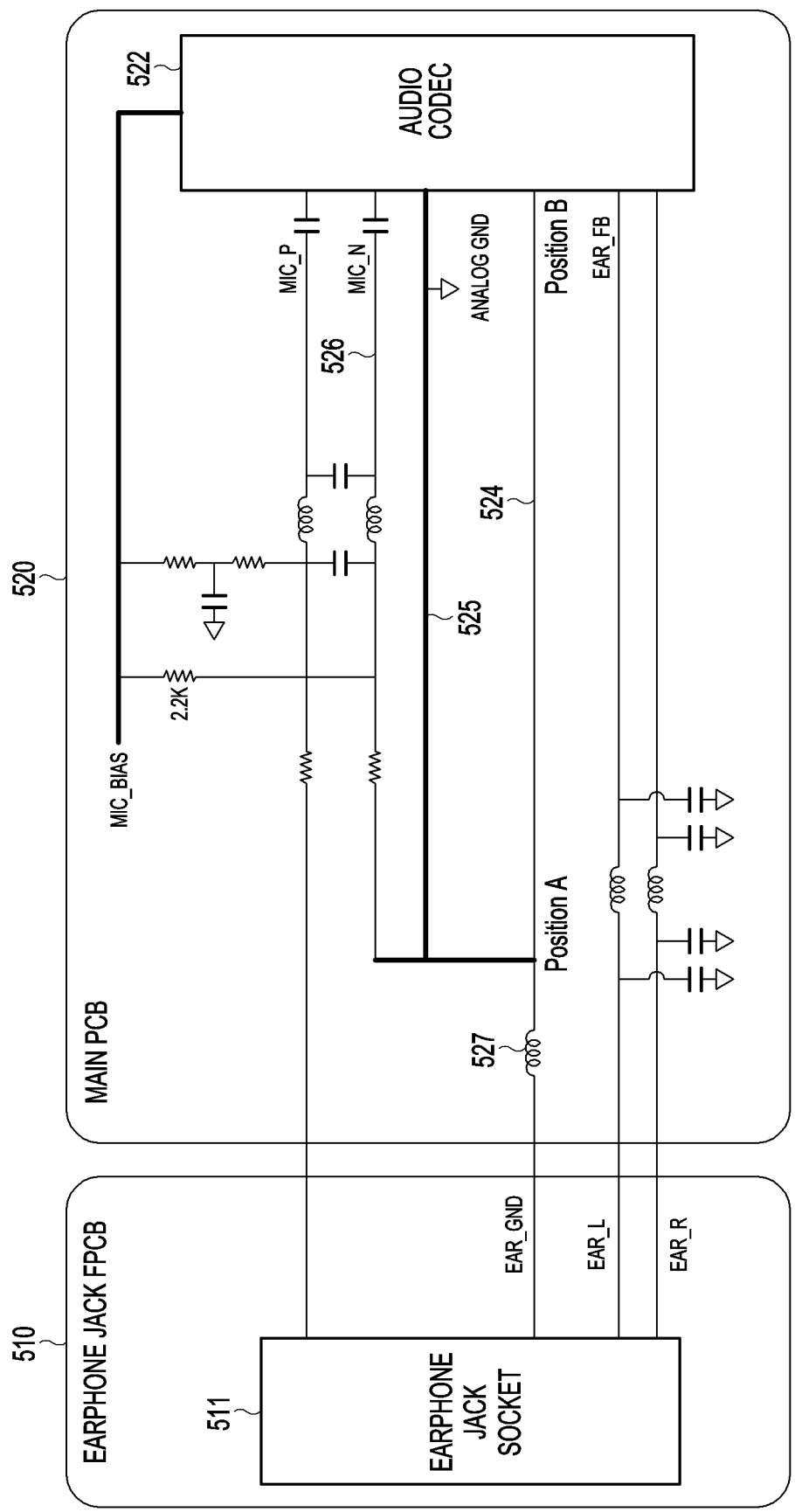
FIG. 5 is a view illustrating a circuit of an electronic device according to various embodiments of the present invention.

FIG. 5 is a view illustrating a circuit of an electronic device according to various embodiments of the present invention. Referring to FIG. 5, an electronic device may include an earphone jack flexible printed circuit board (FPCB) 510 (e.g., the earphone jack FPCB 110, 310, or 410) and a main printed circuit board (PCB) 520 (e.g., the main PCB 120, 320, or 420).

According to various embodiments, various components, e.g., an FPCB connector (e.g., the FPCB connector 121, 321, or 421), an audio codec 522 (e.g., the audio codec 122, 322, or 422), and a main MIC 423 (e.g., the main MIC 123 or 423), may be arranged on the main PCB 520. The audio codec 522 may receive an analog voice signal input by the main MIC and convert the analog voice signal into a digital signal.

According to various embodiments, the audio codec 522 may output an analog voice signal and transmit the analog voice signal via the EAR_L and EAR_R line to an earphone jack socket 511 (e.g., the earphone jack socket 111, 311, or 411) and may receive a voice signal via an EAR_MIC_P line and EAR_MIC_N line from the earphone jack socket 511.

According to various embodiments, the earphone jack of the earset may be plugged or connected via the earphone jack socket 311 formed on the earphone jack FPCB 510. For example, four terminals (e.g., EAR_MIC, EAR_GND, EAR_L, and EAR_R) of the earphone jack socket 511 each may be connected to the FPCB connector 121 formed on the main PCB 520. Among the four terminals formed in the earphone jack socket 511, the EAR_MIC is a terminal that outputs signals input via the microphone provided in the earset, the EAR_GND is a ground terminal for input/output signals of the earphone or microphone, the EAR_L is a terminal for left voice signal input in the earphone provided in the earset, and the EAR_R is a terminal for right voice signal input in the earphone provided in the earset.

According to various embodiments, the four terminals of the earphone jack socket 511 may be separately connected to the terminals of the audio codec 522 via the FPCB connector. For example, the EAR_MIC terminal of the earphone jack socket 511 may be connected with the EAR_MIC_P terminal of the audio codec 522. The EAR_GND terminal of the earphone jack socket 511 may be connected with the earphone feedback terminal (EAR_FB) of the audio codec 522, and the signal output via the EAR_GND terminal (the earphone ground terminal or microphone ground terminal) may be fed back, as an input signal, to the differential amplifier in the audio codec 522. According to various embodiments of the present invention, a position near the FPCB connector on the connection line of the earphone feedback terminal is referred to as position A, and a position near the audio codec 522 is referred to as position B.

According to various embodiments, the EAR_L terminal of the earphone jack socket 511 may be connected with the left voice signal output terminal of the audio codec 522 via the FPCB connector, and the EAR_R terminal may be connected with the right voice signal output terminal of the audio codec 522 via the FPCB connector.

According to various embodiments, upon connection with the ground unit of the audio codec 522 at position A on the connection line of the earphone feedback terminal where the EAR_GND of the earphone jack socket 511 and the earphone feedback terminal EAR_FB are connected, a better performance may result for crosstalk between the left and right signals of the received signals Rx, but the PAM disposed on the main PCB 520 may come close to position A and may thus be significantly influenced by noise due to TDMA signals.

According to various embodiments, upon connection with the ground unit of the audio codec 522 at position B on the connection line of the earphone feedback terminal where the EAR_GND of the earphone jack socket 511 and the earphone feedback terminal EAR_FB are connected, the PAM is separated away from position B and is thus relatively less influenced by TDMA noise. However, as the distance between the FPCB connector and the ground unit increases, the resistance increases and performance for crosstalk of received signals Rx may be deteriorated.

According to various embodiments, as shown in FIG. 5, a separate pattern (or transmission line) 525 may be formed in parallel at the earphone feedback terminal EAR_FB adjacent to the FPCB connector, and the pattern (or transmission line) 525 may be directly connected to the ground unit of the audio codec 522. As the pattern 525 is formed, such an effect as grounding to position C adjacent to the audio codec 522 may result. According to various embodiments of the present invention, formation of such a pattern may raise the performance for crosstalk while being less influenced by TDMA noise due to the PAM.

According to various embodiments, the separately formed pattern 525 may be shared with, or at least partially connected with, the MIC_N line through which the microphone signal output through the earphone jack socket 511 is transmitted. For example, the pattern 525 may be used as a ground unit for the microphone signal output from the earphone jack socket 511. According to various embodiments of the present invention, at least one coil 527 or bead may be connected in series between the FPCB connector and the pattern 525. FM noise signals output to the EAR_GND terminal of the earphone jack socket 511 may be removed by the coil 527.

According to an embodiment, an electronic device comprises a circuit board including a first ground unit and a second ground unit, a wireless communication circuit including a first ground terminal electrically connected with the first ground unit and disposed in a first area of the circuit board, an audio codec circuit including a second ground terminal electrically connected with the second ground unit and an input terminal of signal and disposed in a second area of the circuit board, and a connector including a first pin electrically connected with the input terminal and electrically connectable with a signal terminal of a microphone included in an external electronic device and a second pin electrically connectable with a ground terminal of the microphone, the second pin electrically connected with the second ground unit.

According to various embodiments of the present invention, the second pin may be connected with an earphone feedback terminal of the audio codec circuit.

According to various embodiments of the present invention, the circuit board may include a conductive pattern connected between the second pin and the second ground terminal.

According to various embodiments of the present invention, the circuit board may include another microphone, and the second pin may be electrically connected with at least one terminal of the other microphone.

According to various embodiments of the present invention, the circuit board may include at least one coil connected in series between the conductive pattern and the second pin.

According to various embodiments of the present invention, the circuit board may include at least one capacitor connected in parallel between the conductive pattern and the second pin.

According to various embodiments of the present invention, the circuit board may include another microphone and a conductive pattern connected between the second pin and at least one terminal of the other microphone.

According to various embodiments of the present invention, the circuit board may include at least one coil connected in series between the conductive pattern and the second pin.

According to various embodiments of the present invention, the circuit board may include at least one capacitor connected in parallel between the conductive pattern and the second pin.

According to various embodiments of the present invention, the circuit board may include at least one filter circuit electrically connected between the first ground unit and the second ground unit.

According to various embodiments of the present invention, the electronic device may further comprise an earphone jack connector forming an opening in an outer appearance of the electronic device, wherein the first pin and the second pin may be disposed in the opening.

According to another embodiment, an electronic device comprises a circuit board including a first ground unit and a second ground unit, a wireless communication circuit including a first ground terminal electrically connected with the first ground unit and disposed in a first area of the circuit board, an audio codec circuit including a second ground terminal electrically connected with the second ground unit and a signal input terminal and disposed in a second area of the circuit board, and a connector including a first pin electrically connectable with a signal terminal of a microphone included in an external electronic device and a second pin electrically connectable with a ground terminal of a microphone included in the external electronic device, wherein the first pin is electrically connected with the microphone input terminal of the audio codec circuit, the second pin is electrically connected with the earphone feedback terminal of the audio codec circuit, and the second pin may be directly connected with the second ground terminal of the audio codec circuit by a conductive pattern.

According to various embodiments of the present invention, the circuit board may include another microphone, and the second pin may be electrically connected with at least one terminal of the other microphone.

According to various embodiments of the present invention, the circuit board may include at least one coil connected in series between the conductive pattern and the second pin.

According to various embodiments of the present invention, the circuit board may include at least one capacitor connected in parallel between the conductive pattern and the second pin.

According to various embodiments of the present invention, the circuit board may include another microphone and a conductive pattern connected between the second pin and at least one terminal of the other microphone.

According to various embodiments of the present invention, the circuit board may include at least one coil connected in series between the conductive pattern and the second pin.

According to various embodiments of the present invention, the circuit board may include at least one capacitor connected in parallel between the conductive pattern and the second pin.

According to various embodiments of the present invention, the circuit board may include at least one filter circuit electrically connected between the first ground unit and the second ground unit.

According to various embodiments of the present invention, the electronic device may further comprise an earphone jack connector forming an opening in an outer appearance of the electronic device, wherein the first pin and the second pin may be disposed in the opening.

Figure 6:
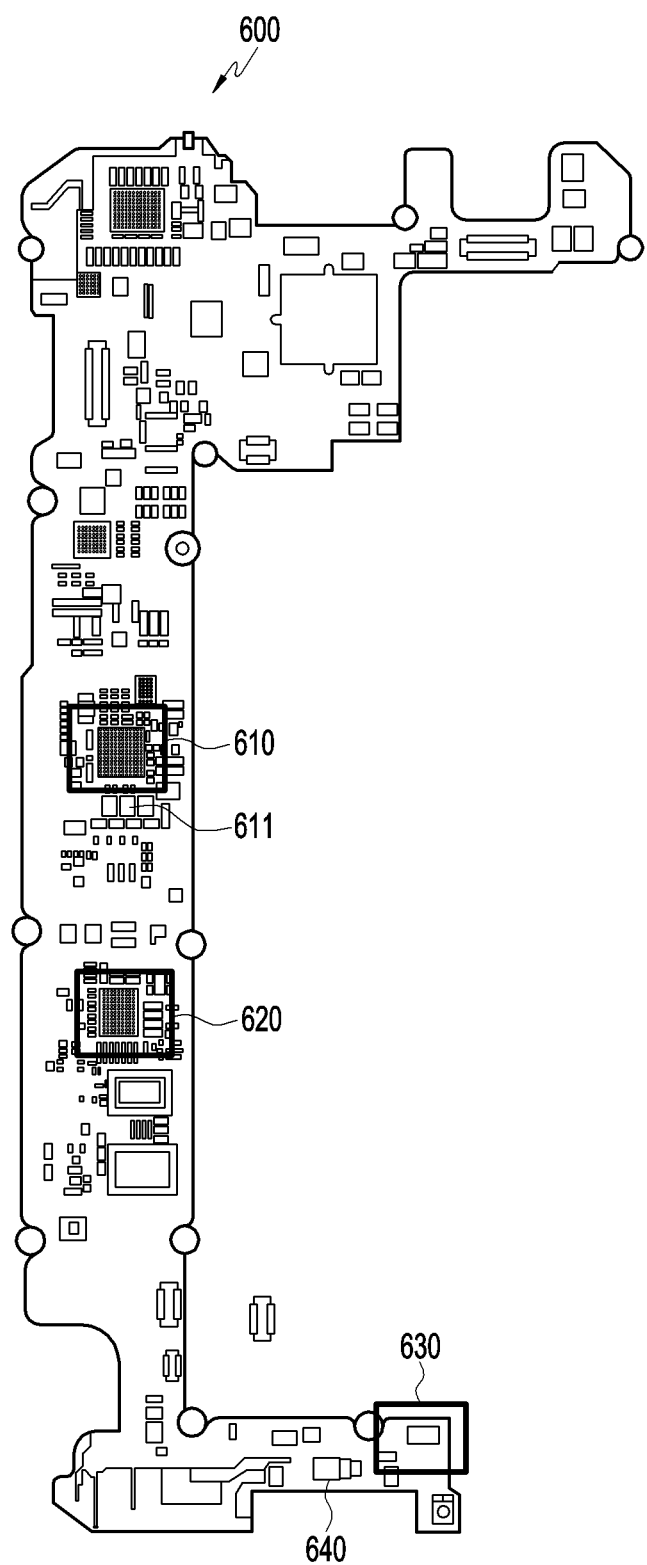
FIG. 6 is a view illustrating a circuit board according to various embodiments of the present invention.

FIG. 6 is a view illustrating a circuit board according to various embodiments of the present invention. Referring to FIG. 6, according to various embodiments of the present invention, a printed circuit board (PCB) 600 (e.g., the main PCB 120, 320, 420, or 520) may include an audio codec 610 (e.g., the audio codec 122, 322, 422, or 522)), power amplifier module (PAM) 620, an earphone jack FPCB connecting unit 630 (e.g., the FPCB connector 121, 321, or 421)), and an earphone jack ground terminal (GND) 640. A ground unit 611 for signals related to the audio codec 610 may be formed around the audio codec 610.

As shown in FIG. 6, as the PAM 620 is disposed adjacent to the earphone jack ground terminal 640 on the printed circuit board 600, ground noise may be induced at the EAR_GND around the earphone jack FPCB connecting unit 630, distorting the EAR_MIC_P and EAR_MIC_N signals.

According to various embodiments of the present invention, as described above in connection with FIGS. 1 to 5, a separate pattern electrically connected with the earphone jack ground terminal 640, adjacent to the earphone jack FPCB connecting unit 630, may be formed and connected with the ground unit 611 of the audio codec 610, reducing noise due to the PAM 620.

Figure 7:
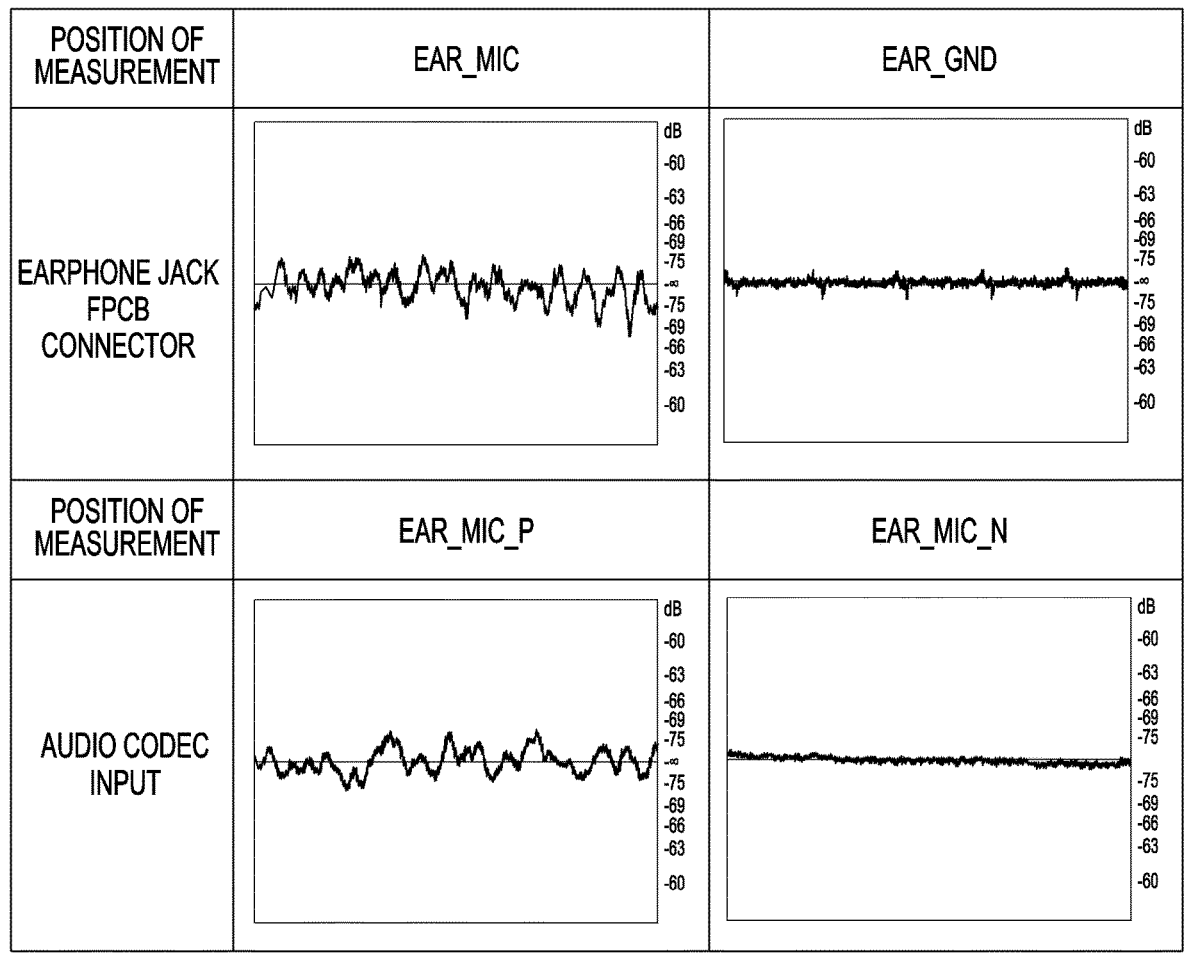
FIG. 7 is a graph of a signal measured at each point of a circuit board according to various embodiments of the present invention.

FIG. 7 is a graph of a signal measured at each point of a circuit board according to various embodiments of the present invention. Referring to FIG. 7, as described above, a separate pattern electrically connected with the earphone jack ground terminal 640, adjacent to the earphone jack FPCB connecting unit 630, may be formed and connected with the ground unit 611 of the audio codec 610, reducing noise due to the PAM 620. For example, the analog connecting unit of the audio codec may be used as an earphone connecting unit, thereby fundamentally removing TDMA noise signals due to the PAM disposed on the printed circuit board.

It may be identified from FIG. 7 that EAR_MIC_P signal and EAR_MIC_N signal noise may be removed by getting rid of EAR_GND signal noise around the earphone jack FPCB connector.

Figure 8:
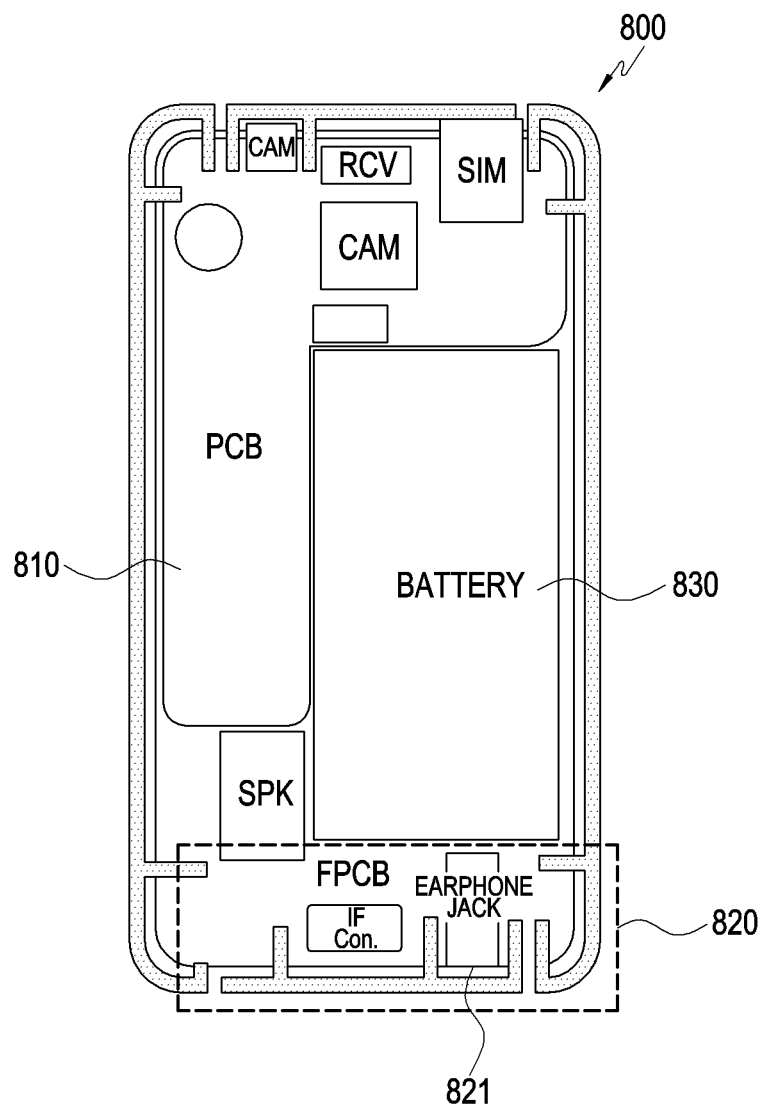
FIG. 8 is a view illustrating an internal configuration of an electronic device according to various embodiments of the present invention.

FIG. 8 is a view illustrating an internal configuration of an electronic device according to various embodiments of the present invention. Referring to FIG. 8, according to various embodiments of the present invention, an electronic device 800 (e.g., the electronic device of FIGS. 1 to 6) may include a PCB 810 (e.g., the main PCB 120, 320, 420, or 520), an FPCB 820 (e.g., the earphone jack FPCB 110, 310, 410, or 510), an earphone jack connector 821 (e.g., the earphone jack socket 111, 311, 411, or 511)), and a battery 830. The PCB 810 may be connected with the FPCB 820 by an FPCB connector. According to an embodiment, the PCB 810 and the FPCB 820 may be formed as a single circuit board.

According to various embodiments, if an earset (e.g., an external electronic device) is plugged into the earphone jack connector 821, microphone signals output from the earphone jack may be transmitted to the audio codec of the PCB 810. Voice signals output from the audio codec disposed on the PCB 810 may be transmitted to the earphone jack plugged into the earphone jack connector 821 and may be output via the speaker or earphone of the earset. A plurality of pins may be formed in the earphone jack connector 821. As set forth above, the pins may be individually connected with the terminals inserted into the earphone jack connector 821 and be connected with the terminals of the audio codec disposed on the PCB 810.

Figure 9:
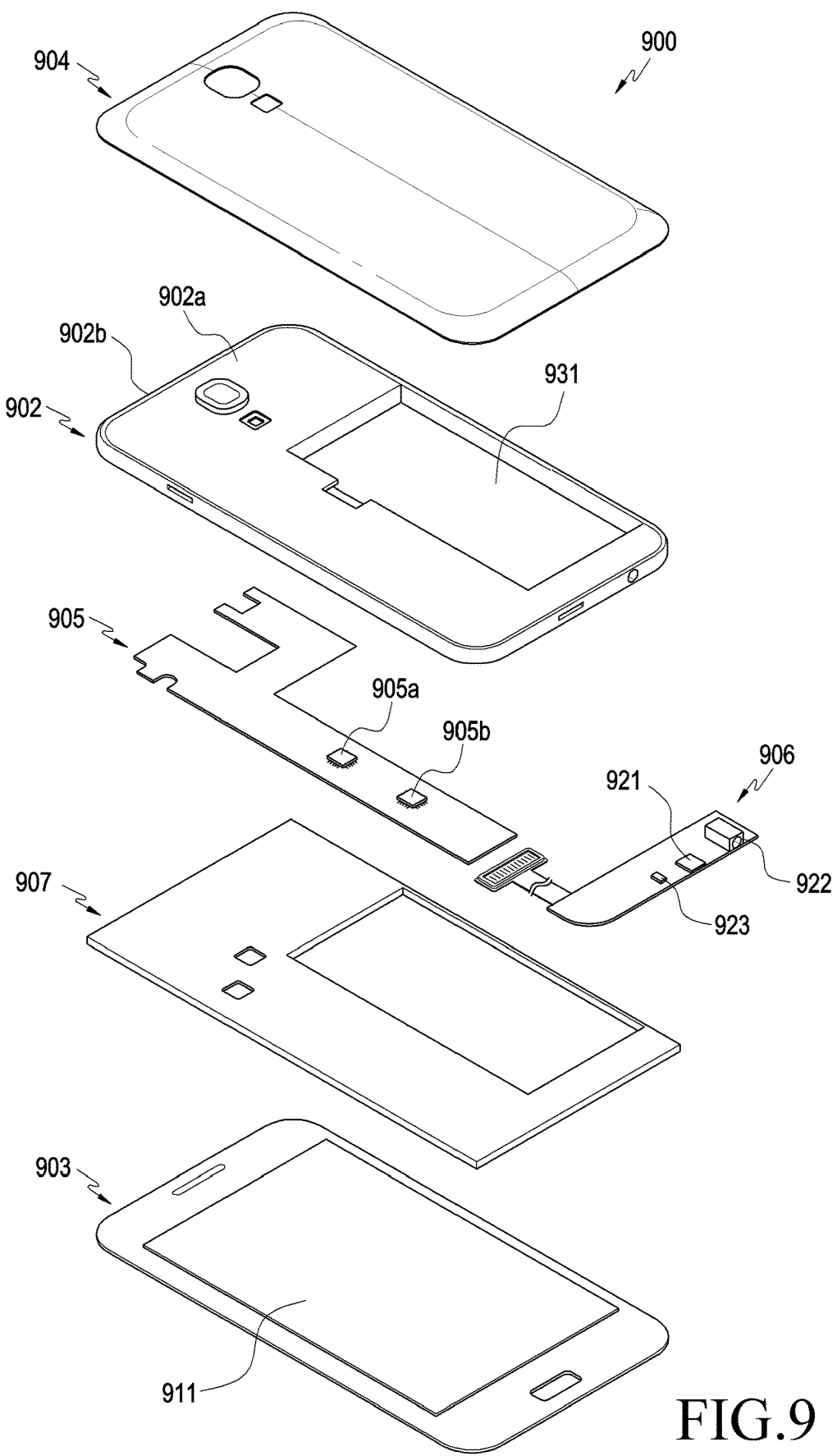
FIG. 9 is an exploded perspective view illustrating an electronic device according to according to various embodiments of the present invention.

FIG. 9 is an exploded perspective view illustrating an electronic device 900 according to various embodiments of the present invention. Referring to FIG. 9, according to various embodiments of the present invention, an electronic device 900 (e.g., the electronic device of FIGS. 1 to 6) may include a first housing 904 forming a portion of the outside surface of the electronic device 900. For example, the first housing 904 may form a rear surface of the electronic device 900. The whole or part of the first housing 904 may be formed of a metal.

According to an embodiment of the present invention, the electronic device 900 may include a second housing 902 coupled with the first housing 904 and forming another portion of the outside surface of the electronic device. For example, the second housing 902 may form a side wall of the electronic device 900. For example, the first housing 904 and the second housing 902 may be configured detachably, or integrally such that the first housing 904 and the second housing 902 are not separated from each other.

According to various embodiments of the present invention, the electronic device 900 may include a case member 907. The case member 907 may be disposed on an inside surface of the second housing 902 and coupled with the second housing 902.

According to an embodiment of the present invention, the case member 903 may be shaped to have a front opening; for example, the case member 907 forms the front surface while the second housing 902 forms the side walls, thereby leaving a receiving space with a front opening. For example, the case member 907 may be formed of a synthetic resin, and the second housing 902 may, in whole or part, be formed of a metal.

According to various embodiments, the antenna for wireless communication may be formed in at least a portion of the metallic second housing 902. As another example, the antenna may be formed adjacent the metallic second housing 902. For instance, the antenna may be attached onto circuit boards 905 and 906 in the electronic device 900 to be positioned adjacent the second housing 902 or onto a carrier (not shown) disposed on the circuit boards 905 and 906 to be positioned adjacent the second housing 902.

According to various embodiments, the electronic device 900 may include a front cover 903 mounted on the second housing 902. According to an embodiment, the front cover 903 may be configured of a window member combined with a display 911. According to various embodiments, the front cover 903 may be integrated with a touch panel, offering the functions of an input device.

According to various embodiments of the present invention, the electronic device 900 may include the circuit boards 905 and 906 received in the case member 907. For example, the circuit boards 905 and 906 may include at least one component (e.g., the earphone jack PCB 110, 310, 410, or 510 or the main PCB 120, 320, 420, or 520) included in the electronic device described above in connection with FIGS. 1 to 5. The circuit boards 905 and 906 may further include a connector with one or more connection pins for connection with an external device, such as a universal serial bus (USB) connector, earphone jack FPCB connector, connector (not shown) for storage, interface connector (not shown), or a charging connector (not shown). The connector may include at least one conductive member 921 and 922. The circuit boards 905 and 906 may further include an adjusting circuit 923 electrically connected with the conductive members 921 and 922. At least one of the conductive members 921 and 922 may form an earphone jack connector 922 (e.g., the earphone jack socket 111, 311, 411, or 511).

Figure 10:
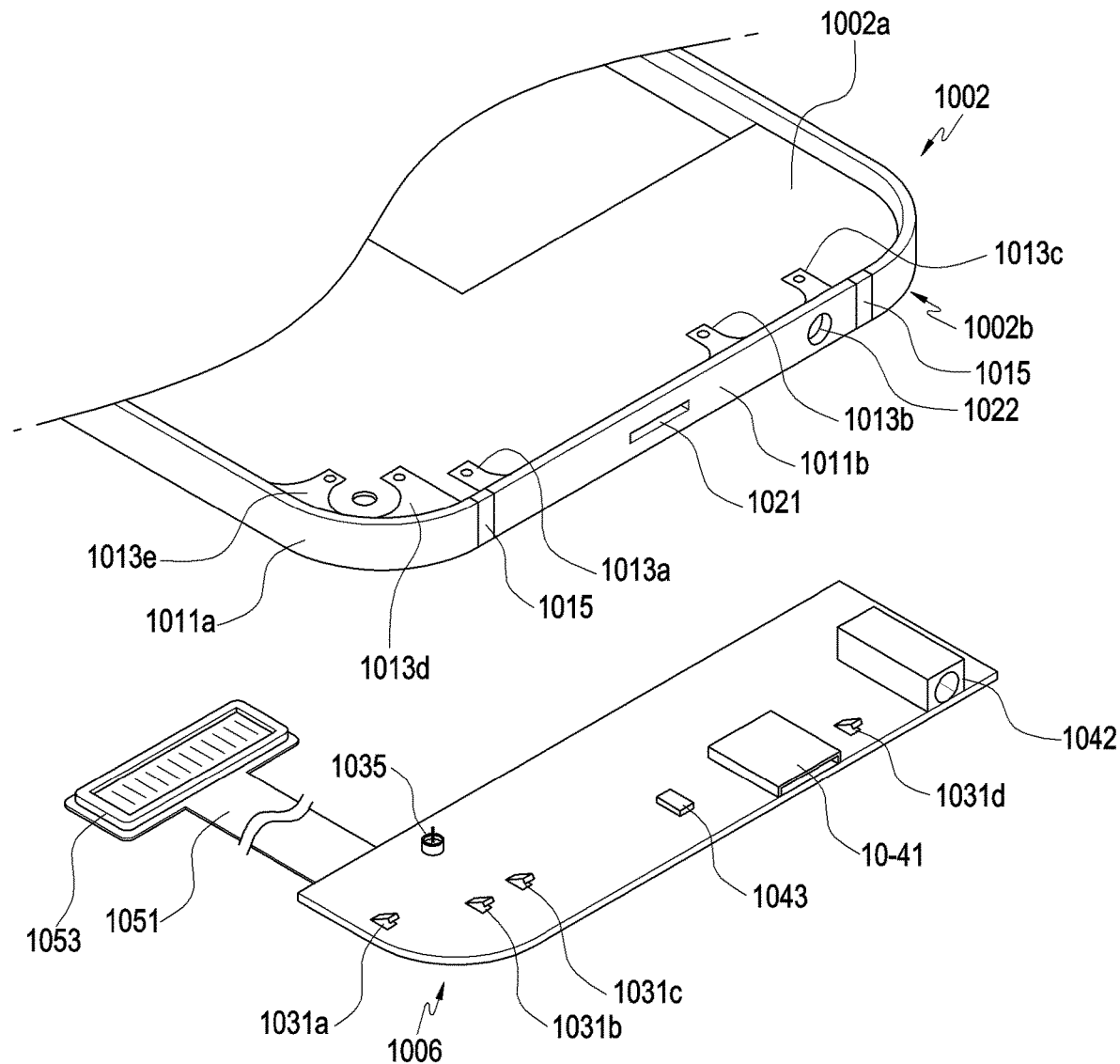
FIG. 10 is an exploded perspective view illustrating an electronic device according to according to various embodiments of the present invention.

FIG. 10 is an exploded perspective view illustrating a portion of an electronic device (e.g., the electronic device 800 or electronic device 900) according to various embodiments of the present invention. Referring to FIG. 10, according to various embodiments of the present invention, the electronic device may include a case member 1003 and a housing 1002 disposed on one surface of the case member 1003 to form a side wall of the electronic device.

For example, the housing 1002 may be wholly or partially formed of a metal. For example, the housing 1002 may include a plurality of dividing portions 1015 formed of a non-metallic material and the rest formed of a metal.

For example, if the electronic device includes a connector (e.g., a USB connector or earphone connector) for connection with an external electronic device (e.g., a charger or earphone), the housing 1002 may have openings 1021 and 1022 to provide a connection path to the connector. The connector may be disposed to partially be exposed to the outside through the openings 1021 and 1022 of the housing 1002.

For example, to reinforce the fastening between the case member 1003 and the housing 1002, the housing 1002 may include a plurality of fastening pieces 1013a, 1013b, 1013c, 1013d, and 1013e. For example, the plurality of fastening pieces 1013a, 1013b, 1013c, 1013d, and 1013e may be led from the inside of the housing 1002 and be positioned inside the case member 1003, providing a more solid fastening between the housing 1002 and the case member 1003. At least one of the plurality of fastening pieces 1013a, 1013b, 1013c, 1013d, and 1013e may be used as a connection piece to electrically connect part of the housing 1002 to the circuit board 1006.

According to various embodiments of the present invention, the circuit board 1006 may include a flexible printed circuit board or ribbon cable 1051 for connection with another circuit board (e.g., the printed circuit board 120, 220, 420, or 520 of FIGS. 1 to 5) and a connector 1053 provided at an end thereof. If a communication module is disposed on the other circuit board, the circuit board 1006 may communicate wireless communication signals with the other circuit board via the flexible printed circuit board or ribbon cable 1051.

As another example, the circuit board 1006 may include a coaxial connector 1035. If a communication module is disposed on the other circuit board, the circuit board 1006 may communicate wireless communication signals with the other circuit board via a coaxial cable (not shown) connected to the coaxial connector 1035.

According to various embodiments, the circuit board 1006 may include a plurality of connection terminals 1031a, 1031b, 1031c, and 1031d (e.g., C-clips). The circuit board 1006 may electrically be connected with at least one of the first portion 1011a or second portion 1011b of the housing 1002 which is used as an antenna through at least one of the plurality of connection terminals 1031a, 1031b, 1031c, and 1031d. For example, at least one of the first portion 1011a or second portion 1011b of the housing 1002 used as an antenna may be connected with a power feeding part or ground included in the circuit board 1006 via at least one of the plurality of connection terminals 1031a, 1031b, 1031c, and 1031d.

According to various embodiments of the present invention, the circuit board 1006 may include a connector for connection with an external electronic device (e.g., a charger or an earphone). The connector may be received in a conductive member 1041 or 1042 (e.g., the conductive member 921 or 922). At least one of the conductive members 1041 and 1042 may form an earphone jack connector 1042 (e.g., the earphone jack socket 111, 311, 411, or 511).

As another example, at least a portion of the outside surface of the connector may be formed of a conductive member. The conductive members 1041 and 1042 receiving connectors may be disposed such that the connectors may partially be exposed to the outside through the openings 1021 and 1022 of the housing 1002. According to various embodiments, the circuit board 1006 may include an adjusting circuit 1043 electrically connected with the conductive members 1041 and 1042 and configured to vary impedance.

Figure 11:
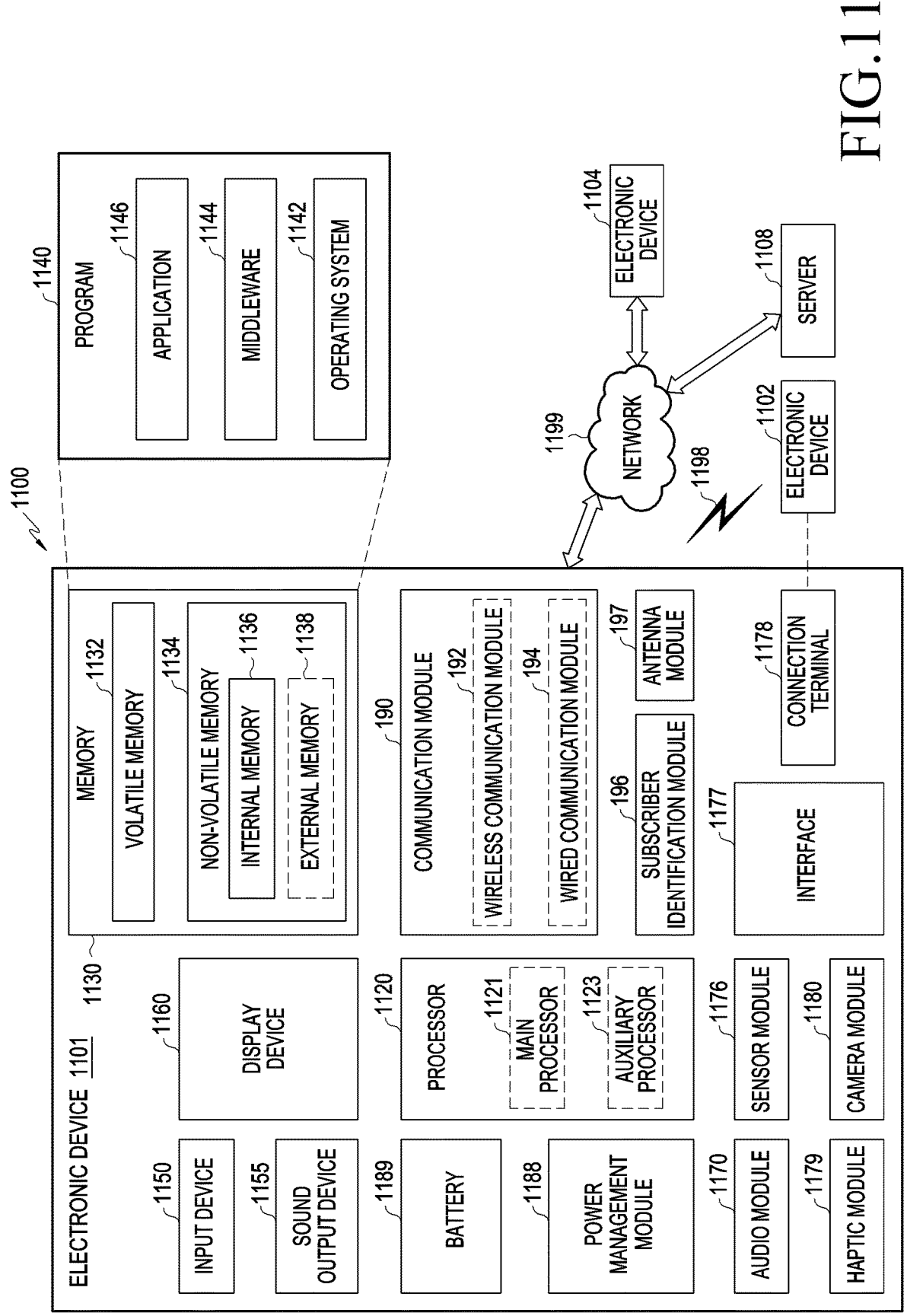
FIG. 11 is a view illustrating a network configuration according to an embodiment of the present invention.

FIG. 11 is a block diagram illustrating an electronic device 1101 (e.g., the electronic device 800 or the electronic device 900) in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, and an antenna module 1197. In some embodiments, the electronic device 1101 may exclude at least one of the components or may add another component. In some embodiments, some components may be implemented to be integrated together, e.g., as if the sensor module 1176 (e.g., a fingerprint sensor, an iris sensor, or an illuminance sensor) is embedded in the display device 1160 (e.g., a display).

The processor 1120 may drive, e.g., software (e.g., a program 1140) to control at least one other component (e.g., a hardware or software component) of the electronic device 1101 connected with the processor 1120 and may process or compute various data. The processor 1120 may load and process an instruction or data received from another component (e.g., the sensor module 1176 or the communication module 1190) on a volatile memory 1132, and the processor 1120 may store resultant data in a non-volatile memory 1134. According to an embodiment, the processor 1120 may include a main processor 1121 (e.g., a central processing unit (CPU) or an application processor), and additionally or alternatively, an auxiliary processor 1123 (e.g., a graphics processing unit (GPU), an image signal processor, a sensor hub processor, or a communication processor) that is operated independently from the main processor 1121 and that consumes less power than the main processor 121 or is specified for a designated function. Here, the auxiliary processor 1123 may be operated separately from or embedded in the main processor 1121.

In such case, the auxiliary processor 1123 may control at least some of functions or states related to at least one (e.g., the display device 1160, the sensor module 1176, or the communication module 1190) of the components of the electronic device 1101, instead of the main processor 1121 while the main processor 1121 is in an inactive (e.g., sleep) state or along with the main processor 1121 while the main processor 1121 is an active state (e.g., performing an application). According to an embodiment, the auxiliary processor 1123 (e.g., an image signal processor or a communication processor) may be implemented as part of another component (e.g., the camera module 1180 or the communication module 1190) functionally related to the auxiliary processor 123. The memory 1130 may store various data used by at least one component (e.g., the processor 1120 or sensor module 1176) of the electronic device 1101, e.g., software (e.g., the program 1140) and input data or output data for a command related to the software. The memory 1130 may include the volatile memory 1132 or the non-volatile memory 1134.

The program 1140, as software stored in the memory 1130, may include, e.g., an operating system (OS) 1142, middleware 1144, or an application 1146.

The input device 1150 may be a device for receiving a command or data, which is to be used for a component (e.g., the processor 1120) of the electronic device 1101, from an outside (e.g., a user) of the electronic device 1101. The input device 1150 may include, e.g., a microphone, a mouse, or a keyboard.

The sound output device 1155 may be a device for outputting sound signals to the outside of the electronic device 1101. The sound output device 1155 may include, e.g., a speaker which is used for general purposes, such as playing multimedia or recording and playing, and a receiver used for call receiving purposes only. According to an embodiment, the receiver may be formed integrally or separately from the speaker.

The display 1160 may be a device for visually providing information to a user of the electronic device 1101. The display device 2660 may include, e.g., a display, a hologram device, or a projector and a control circuit for controlling the display, hologram device, or projector. According to an embodiment, the display device 1160 may include touch circuitry or a pressure sensor capable of measuring the strength of a pressure for a touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) wiredly or wirelessly coupled with the electronic device 1101.

The sensor module 1176 may generate an electrical signal or data value corresponding to an internal operating state (e.g., power or temperature) or external environmental state of the electronic device 1101. The sensor module 1176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 1177 may support a designated protocol enabling a wired or wireless connection with an external electronic device (e.g., the electronic device 1102). According to an embodiment, the interface 1177 may include a high definition multimedia interface (HDMI), a universal serial bus (USB) interface, a secure digital (SD) card interface, or an audio interface.

A connecting terminal 1178 may include a connector, e.g., a HDMI connector, a USB connector, an SD card connector, or an audio connector (e.g., a headphone connector), which is able to physically connect the electronic device 1101 with an external electronic device (e.g., the electronic device 1102).

The haptic module 1179 may convert an electrical signal into a mechanical stimulus (e.g., a vibration or motion) or electrical stimulus which may be recognized by a user via his tactile sensation or kinesthetic sensation. The haptic module 1179 may include, e.g., a motor, a piezoelectric element, or an electric stimulator.

The camera module 1180 (e.g., the image sensor module 110 of FIG. 1) may capture a still image or moving images. According to an embodiment, the camera module 1180 may include one or more lenses, an image sensor (e.g., the image sensor 111 of FIG. 1), an image signal processor (e.g., the processor 120 of FIG. 1), or a flash.

The power management module 1188 may be a module for managing power supplied to the electronic device 1101. The power management module 188 may be configured as at least part of, e.g., a power management integrated circuit (PMIC).

The battery 1189 may be a device for supplying power to at least one component of the electronic device 1101. The battery 189 may include, e.g., a primary cell which is not rechargeable, a secondary cell which is rechargeable, or a fuel cell.

The communication module 1190 may support establishing a wired or wireless communication channel between the electronic device 1101 and an external electronic device (e.g., the electronic device 1102, the electronic device 1104, or the server 1108) and performing communication through the established communication channel. The communication module 1190 may include one or more communication processors that are operated independently from the processor 1120 (e.g., an application processor) and supports wired or wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of the wireless communication module 192 and the wired communication module 194 may be used to communicate with an external electronic device through a first network 1198 (e.g., a short-range communication network, such as Bluetooth, wireless-fidelity (Wi-Fi) direct, or infrared data association (IrDA)) or a second network 1199 (e.g., a long-range communication network, such as a cellular network, the Internet, or a communication network (e.g., LAN or wide area network (WAN)). The above-enumerated types of communication modules 1190 may be implemented in a single chip or individually in separate chips.

According to an embodiment, the wireless communication module 1192 may differentiate and authenticate the electronic device 1101 in the communication network using user information stored in the subscriber identification module 1196.

The antenna module 1197 may include one or more antennas for transmitting or receiving a signal or power to/from an outside. According to an embodiment, the communication module 1190 (e.g., the wireless communication module 1192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., instructions or data) therebetween.

According to an embodiment, instructions or data may be transmitted or received between the electronic device 1101 and the external electronic device 1104 via the server 1108 coupled with the second network 1199. Each of the electronic devices 1102 and 2204 may be a device of a same type as, or a different type, from the electronic device 1101. According to an embodiment, all or some of operations executed on the electronic device 1101 may be run on one or more other external electronic devices. According to an embodiment, when the electronic device 1101 should perform a certain function or service automatically or at a request, the electronic device 1101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device

1101. The electronic device 1101 may provide a requested function or service by processing the received result as it is or additionally. To that end, a cloud computing, distributed computing, or client-server computing technology may be used, for example.

Figure 12:
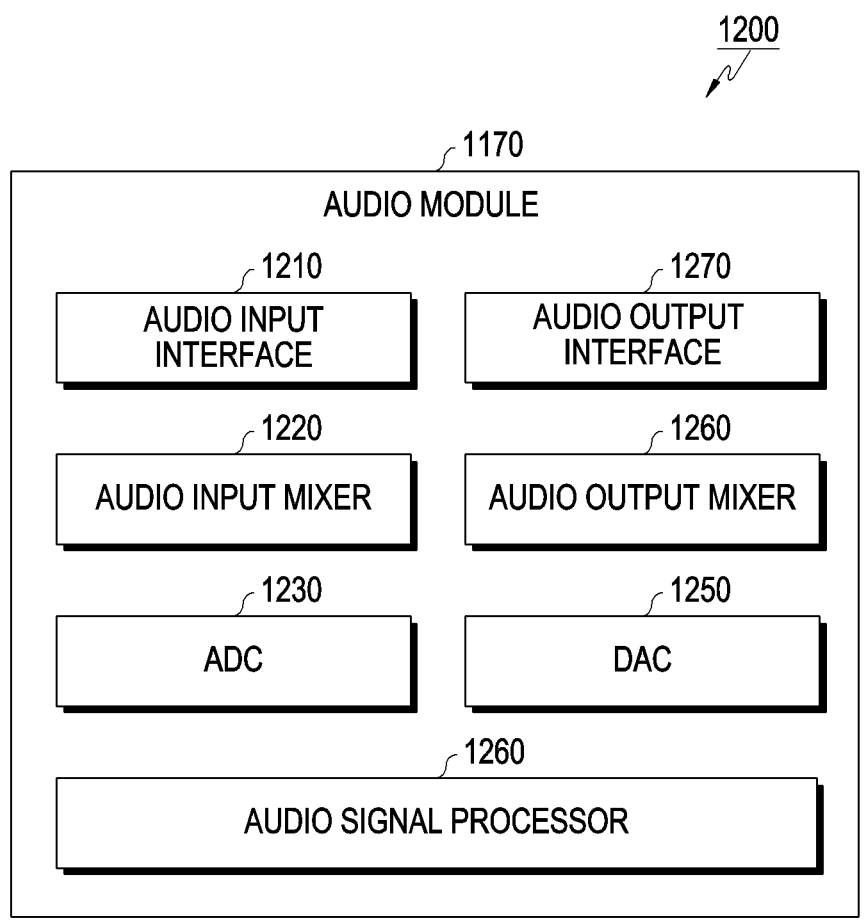
FIG. 12 is a block diagram illustrating a detailed structure of an audio module according to an embodiment of the present invention.

FIG. 12 is a block diagram 1200 illustrating an audio module 1170 (e.g., the audio codec 122, 322, 422, or 522) according to various embodiments. Referring to FIG. 12, the audio module 1170 may include, for example, an audio input interface 1210, an audio input mixer 1220, an analog-to-digital converter (ADC) 1230, an audio signal processor 1240, a digital-to-analog converter (DAC) 1250, an audio output mixer 1260, or an audio output interface 1270.

The audio input interface 1210 may receive an audio signal corresponding to a sound obtained from the outside of the electronic device 1101 via a microphone (e.g., a dynamic microphone, a condenser microphone, or a piezo microphone) that is configured as part of the input device 1150 or separately from the electronic device 1101. For example, upon obtaining an audio signal from the external electronic device 1102 (e.g., a headset or microphone), the audio input interface 1210 may be connected with the external electronic device 1102 wiredly through the connecting terminal 1178 or wirelessly (e.g., Bluetooth communication) through the wireless communication module 1192 to receive the audio signal. According to an embodiment, the audio input interface 1210 may receive a control signal (e.g., a volume adjustment signal using an input button) related to the audio signal obtained from the external electronic device 1102. The audio input interface 1210 may include a plurality of audio input channels and may receive a different audio signal per audio input channel. According to an embodiment, additionally or alternatively, the audio input interface 1210 may receive an audio signal from another component (e.g., the processor 1120 or the memory 1130) of the electronic device 1101.

The audio input mixer 1220 may synthesize a plurality of inputted audio signals into at least one audio signal. According to an embodiment, the audio input mixer 1220 may synthesize a plurality of analog audio signals inputted via the audio input interface 1210 into at least one analog audio signal.

The ADC 1230 may convert an analog audio signal into a digital audio signal. According to an embodiment, the ADC 1230 may convert an analog audio signal received via the audio input interface 1210 or, additionally or alternatively, an analog audio signal synthesized via the audio input mixer 1220 into a digital audio signal.

The audio signal processor 1240 may perform various processing on a digital audio signal received via the ADC 1230 or a digital audio signal received from another component of the electronic device 1101. For example, the audio signal processor 1240 may change sampling ratios, apply one or more filters, interpolate, amplify or attenuate (e.g., amplify or attenuate a whole or partial frequency bandwidth of), process noise (e.g., attenuate noise or echoes), change channels (e.g., switch between mono and stereo), mix, or extract a designated signal for one or more digital audio signals. According to an embodiment, at least some functions of the audio signal processor 1240 may be implemented in the form of an equalizer.

The DAC 1250 may convert a digital audio signal into an analog audio signal. According to an embodiment, the DAC 1250 may convert a digital audio signal processed by the audio signal processor 1240 or a digital audio signal obtained from another component of the electronic device 1101 into an analog audio signal.

The audio output mixer 1260 may synthesize a plurality of audio signals, which are to be outputted, into at least one audio signal. According to an embodiment, the audio output mixer 1260 may synthesize an analog audio signal converted by the DAC 1250 and another analog audio signal (e.g., an analog audio signal received via the audio input interface 1210) into at least one analog audio signal.

The audio output interface 1270 may output an analog audio signal converted by the DAC 1250 or, additionally or alternatively, an analog audio signal synthesized by the audio output mixer 1260 to an outside of the electronic device 1101 through the sound output device 1155 (e.g., a speaker (e.g., a dynamic driver or a balanced armature driver) or a receiver) According to an embodiment, the sound output device 1155 may include a plurality of speakers. The audio output interface 1270 may output audio signals having a plurality of different channels (e.g., a stereo channel or a 5.1 channel) through at least some of the plurality of speakers. According to an embodiment, the audio output interface 1270 may be connected with the external electronic device 1102 (e.g., an external speaker or a headset) wiredly via the connecting terminal 1178 or wirelessly via the wireless communication module 1192 to output an audio signal.

According to an embodiment, the audio module 1170 may generate, without separately including the audio input mixer 1220 or the audio output mixer 1260, at least one digital audio signal by synthesizing a plurality of digital audio signals using at least some function of the audio signal processor 1240.

According to an embodiment, the audio module 1170 may include an audio amplifier (not shown) (e.g., a speaker amplifying circuit) that is capable of amplifying an analog audio signal inputted via the audio input interface 1210 or an audio signal that is to be outputted via the audio output interface 1270. According to an embodiment, the audio amplifier may be configured as a module separate from the audio module 1170.

Figure 13:
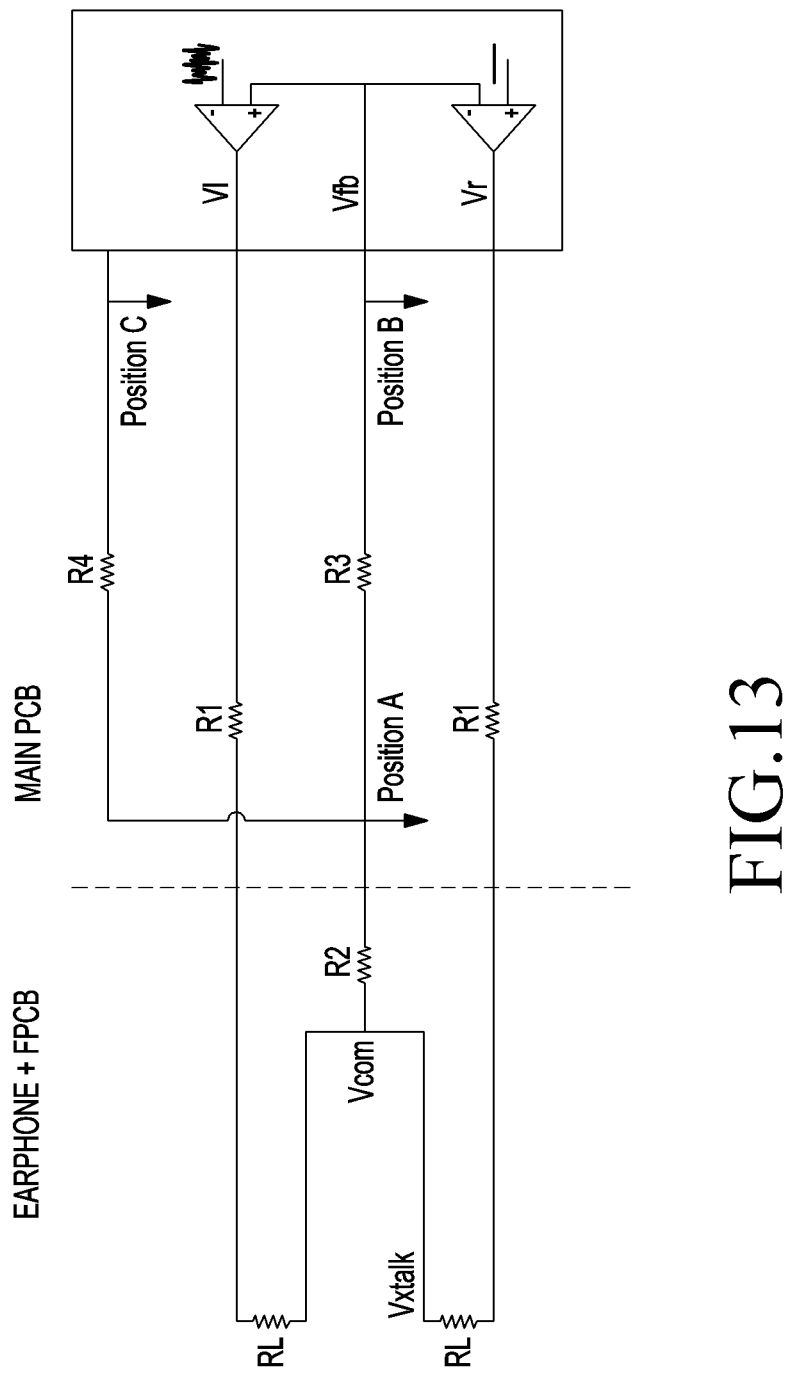
FIG. 13 is a view illustrating a circuit of an electronic device according to various embodiments of the present invention.

FIG. 13 is a view illustrating a circuit of an electronic device according to various embodiments of the present invention. Referring to FIG. 13, the circuit of FIG. 1 may be represented as an equivalent circuit as shown.

$$PositionA : Vxtalk \approx \frac{R2}{RL+R1} \times V1 \rightarrow 20 \times \log\left(\frac{RL+R1}{R2}\right) dB \quad \text{[Equation 1]}$$

$$PositionB : Vxtalk \approx \frac{R2+R3}{RL+R1} \times V1 \rightarrow 20 \times \log\left(\frac{RL+R1}{R2+R3}\right) dB$$

$$PositionC : Vxtalk \approx \frac{R2}{RL+R1} \times V1 \rightarrow 20 \times \log\left(\frac{RL+R1}{R2}\right) dB$$

Referring to Equation 1, since RL, R1>>R2, R3, R4, it may be identified that the earphone GNDs at position A and position C have similar received signal crosstalk performances. It may be identified that at position B, the crosstalk performance is deteriorated due to the resistance R3. It may be identified that at position C, R3 and R4 have no or little influence on crosstalk.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

The embodiments herein are provided merely for better understanding of the present invention, and the present invention should not be limited thereto or thereby. It should be appreciated by one of ordinary skill in the art that various changes in form or detail may be made to the embodiments without departing from the scope of the present disclosure defined by the following claims.

The invention claimed is:

1. An electronic device, comprising:
    a circuit board including a first ground unit and a second ground unit;
    a wireless communication circuit including a first ground terminal electrically connected with the first ground unit and disposed in a first area of the circuit board;
    an audio codec circuit including a second ground terminal electrically connected with the second ground unit and an input terminal of signal and disposed in a second area of the circuit board; and
    a connector including a first pin electrically connected with the input terminal and electrically connectable with a signal terminal of a microphone included in an external electronic device and a second pin electrically connectable with a ground terminal of the microphone, the second pin electrically connected with the second ground unit,
    wherein the circuit board further includes:
    another microphone; and
    a conductive pattern connected between the second pin and at least one terminal of the other microphone.

2. The electronic device of claim 1, wherein the second pin is connected with an earphone feedback terminal of the audio codec circuit.

3. The electronic device of claim 1, wherein the circuit board includes at least one coil connected in series between the conductive pattern and the second pin.

4. The electronic device of claim 1, wherein the circuit board includes at least one capacitor connected in parallel between the conductive pattern and the second pin.

5. The electronic device of claim 1, wherein the circuit board includes at least one filter circuit electrically connected between the first ground unit and the second ground unit.

6. The electronic device of claim 1, further comprising an earphone jack connector forming an opening in an outer appearance of the electronic device, wherein the first pin and the second pin are disposed in the opening.

* * * * *